United States Patent [19]

Bonnetain et al.

[11] Patent Number: 4,463,427
[45] Date of Patent: Jul. 31, 1984

[54] ROAD TRANSPORTATION VEHICLE DRIVE ASSIST PROCESS AND APPARATUS

[75] Inventors: Yves Bonnetain, Lyons; Jean P. Sibeud, Chaponnay, both of France

[73] Assignee: Renault Vehicules Industriels, France

[21] Appl. No.: 288,596

[22] Filed: Jul. 30, 1981

Related U.S. Application Data

[63] Continuation-in-part of Ser. No. 058,453, Jul. 18, 1979, abandoned.

[51] Int. Cl.³ .................. B60K 41/18; G07C 5/08; G09B 19/16
[52] U.S. Cl. .................................... 364/442; 74/866; 364/424.1
[58] Field of Search ................. 364/424, 424.1, 442; 74/866; 340/52 R; 73/114

[56] References Cited

U.S. PATENT DOCUMENTS

| | | | |
|---|---|---|---|
| 3,347,092 | 10/1967 | Stutson | 364/442 |
| 3,916,682 | 11/1975 | Garcea | 73/114 |
| 4,025,897 | 5/1977 | Kisuna et al. | 340/52 R |
| 4,198,882 | 4/1980 | Kiencke et al. | 74/866 |
| 4,291,594 | 9/1981 | Baudoin | 74/866 X |
| 4,294,341 | 10/1981 | Swart | 74/866 X |
| 4,319,501 | 3/1982 | Sugimoto | 74/866 |

Primary Examiner—Felix D. Gruber
Attorney, Agent, or Firm—Remy J. VanOphem

[57] ABSTRACT

The invention pertains to a method and an apparatus, designed to assist the driver of a motor vehicle. The apparatus includes a calculator which is connected to an engine speed sensor, an engine fuel flow sensor, and a transmission speed sensor. The output of the calculator is displayed on an audio/visual display panel. This apparatus defines the operating range of the engine on the load/speed diagram; it also indicates shifting to a different gear, whenever desirable, in order to minimize the vehicle's fuel consumption.

24 Claims, 9 Drawing Figures

ROAD TRANSPORTATION VEHICLE DRIVE ASSIST PROCESS AND APPARATUS

CROSS REFERENCE TO OTHER APPLICATIONS

This application is a continuation-in-part of, and contains subject matter disclosed in the applicant's copending application, Ser. No. 058,453, filed July 18, 1979 and now abandoned.

BACKGROUND OF THE INVENTION

The present invention pertains to a method and an apparatus designed to assist the driver of a motor vehicle.

Usually, the training of truck drivers, and particularly drivers of heavy trucks, is intended to provide a better understanding of the engine operation; it also provides to the drivers knowledge of the most desirable operating areas in the load/engine speed diagram.

This knowledge results in operating the vehicle with a minimal fuel consumption, longer life of the engine and transmission, as well as an abatement of the pollution created by the noise level inside and outside the vehicle, and an abatement of the emission of toxic fumes and chemicals.

In order to achieve these goals, the vehicle manufacturers include some color indicators on the tachometers of some vehicles. Therefore, as long as the driver keeps checking his tachometer and the engine speed with respect to these indicators, the operation of the engine out of the recommended area, for a long period of time, may be avoided.

This practice, however, constitutes only a partial step toward the achievement of the goal, since the operator checks the engine speed only and the load is ignored. Actually, a full definition of the most desirable operating conditions can only be obtained by including the load of the engine.

SUMMARY OF THE INVENTION

The purpose of the invention is to provide a method and an apparatus which provides the required information by comparing the actual operating conditions of the engine with the desirable operating conditions, and indicates the action required to bring the engine back to the desirable operating conditions.

Accordingly, the method designed to assist the driver of a motor vehicle, specifically includes the following operations: it measures the engine speed and load; it defines the operating range of the engine on the load/-speed diagram; it defines the various possible positions of the operating range with reference to the areas of equal fuel consumption on the load/speed diagram, and it also indicates the possibility of using other gear-ratios. The method may also suggest switching gears and indicate the recommended gear-ratio.

According to another aspect of the invention, no indication appears whenever the actual operating range of the engine is optimized. If another operating range is more desirable, a light and/or a sound warning is activated to indicate that a gear shift is desirable and, in this case, an indication is given recommending the use of a higher gear or a lower gear.

According to another aspect of the invention, the indications are displayed on a digital display.

According to another variation of the invention, these indications control an automatic system built in the transmission.

The apparatus required for the implementation of the invented method specifically includes engine speed and fuel flow sensors, a transmission speed sensor, a calculator for the processing of the data supplied by the sensors, and an audio/visual display.

According to another aspect of the invention, the sensor used to measure the engine speed is a tachometric alternator driven by the camshaft of the engine.

According to another variation of the invention, the fuel flow and engine speed sensors consist of only an injection pressure sensor which is connected to a fuel injection pump.

DETAILED DESCRIPTION OF THE INVENTION

Figure 1:
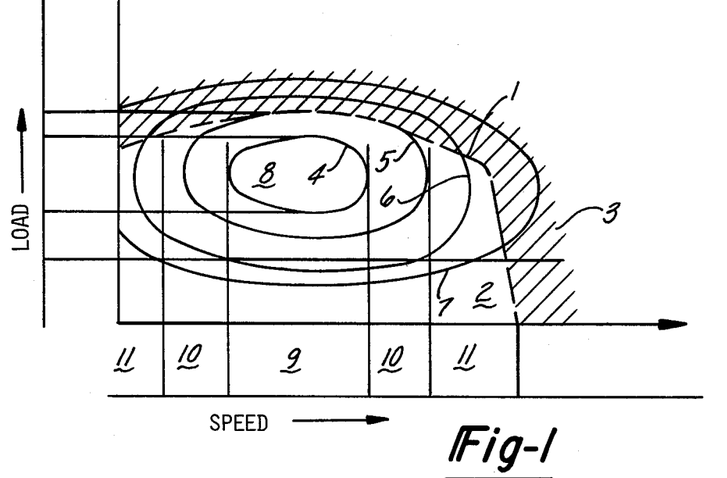
FIG. 1 is a diesel engine load/speed diagram.

A diesel engine load/speed diagram is illustrated in FIG. 1. In this diagram the engine speed is entered in abscissa and the engine load in the ordinate. Curve 1 is the maximum load curve for the engine, it separates an area 2 from a shaded area 3. Considering the adjustment of the injection pump of the engine, the area 2 represents the operating area of the engine. On this diagram, the isometric curves 4, 5, 6, 7 represent the curves of equal fuel consumption. Area 8, inside the central curve 4, represents the engine operating at maximum efficiency.

Conventional tachometer's colored areas are indicated below the diagram, under the applicable portions of the engine speed range. The area 9, for instance, is colored in green on the tachometer's scale, whereas areas 10 on either side of area 9 are colored orange and areas 11 on either side of area 10 are colored red.

The use of colored areas on the tachometer's scale is common practice. However, the use of colored areas on the tachometer's scale is incomplete since it does not account for the engine load. Consideration of the load is necessary to completely define the fuel consumption areas on the diagram.

Figure 2:
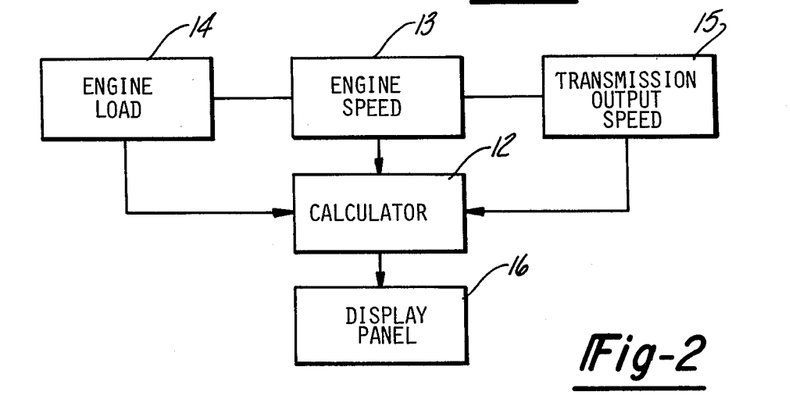
FIG. 2 is a block-diagram, which gives a schematic representation of the apparatus required to implement the process invented.

The driver assist apparatus is shown in block diagram form in FIG. 2. The apparatus includes a calculator 12 which receives inputs from three sensors. The three sensors include a sensor 13 measuring the engine speed, a sensor 14 measuring the engine load, and a sensor 15 giving a reading of the transmission's output speed. The output of the calculator 12 is connected to a visual/audio display panel 16.

The engine speed sensor 13 may be selected among the following: an alternator or tachometric generator driven by the engine; eddy current operated, variable magnetic resistance or variable loss type devices placed in front of a geared or perforated disc driven by the engine; a reciprocating motion sensor, synchronized with the engine speed, and connected to a fuel injection nozzle, a valve, or any other engine components subjected to a reciprocating motion; a pressure sensor connected to the fuel injector lines; or a tachometric alternator driven by the camshaft of the engine.

The engine load sensor 14 may be selected among the following: a foot throttle position sensor, in the case of engines where the load is directly determined by that position, such as carbureted engines, gas injection engines and diesel engines equipped with a "mini-maxi" governor. The sensor may also be placed on any point of the throttle linkage, instead of being placed on the respective pedal. Another possibility consists of using a fuel flow control position sensor, in the case of engines equipped with "all speed" governors. This sensor may be installed on, or inside the fuel injection pump. It can be connected to the injection pump control rack. In the case of a carbureted engine, it is possible to use a pressure sensor installed on a fuel injection line, or on any other fuel flow control apparatus. Other alternative sensors include a static or dynamic pressure sensor connected to the air intake manifold of the engine, the air flow being proportional to the load; an internal pressure sensor for the cylinders; or an exhaust gas temperature sensor.

Figure 3:
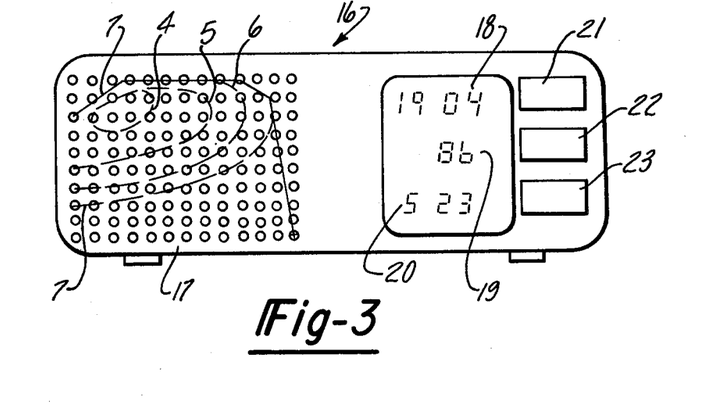
FIG. 3 shows the dial of this apparatus.

FIG. 3 is an example of the arrangement of the displays on the display panel 16. This display panel includes several different displays.

A light bulb or photodiode matrix light display 17 depicts the load/engine speed diagram. This display includes the full-load curve 1, as well as the isoconsumption curves 4, 5, 6, and 7 discussed with reference to FIG. 1. The light signal indicates the current operating state of the engine with respect to the isoconsumption curves. Alternatively, this panel may include a spotlight, or a mechanically controlled pointer, moving behind a ground glass instead of the illustrated light bulb or photodiode matrix.

The digital display panels 18, 19 and 20 respectively indicate the instantaneous measurements of the engine speed, vehicle speed and fuel consumption. The digital display panel 20 may be designed so as to give a new reading every 15 or 30 seconds, the same value remaining on during the intervening interval. Other digital display panels may be added to indicate additional operating data concerning the engine or the vehicle, such as the engine load, the engine torque and the specific consumption.

The gear shift indicator displays 21, 22 and 23 respectively indicate whether the operator should shift to a higher gear, stay with the same gear or shift to a lower gear. One of these three gear shift displays remains on at all times.

The various data supplied by the display panel 16 may be given simultaneously or individually. It is therefore possible to install a central switch to momentarily cancel the effects of the apparatus. The gear shift indicator displays 21, 22 and 23 may be associated with, or supplemented by sound signals, using buzzers, for instance. The visual display may also be reinforced by flashing the appropriate display.

The calculator 12, such as an Intel Model 8080 or 8085 microprocessor, may be used to process the signals indicative of the measured parameters. These signals are supplied by the sensors and represent the engine speed, the fuel flow and the transmission output speed.

The display panel 16 provides for displaying the engine operating range on the load/speed diagram, the engine speed, the vehicle ground speed, as well as the computation of the instant and/or average consumption in liters per kilometer.

The following engine operating and vehicle parameters are required for a proper operation of the apparatus: the isoconsumption specifications of the engine, which help define the isoconsumption curves 4 through 7 as shown in FIGS. 1 and 3; the full-load curve 1 of the engine; the value of the various gears of the transmission; and transmission gear ratios, which are required to calculate the vehicle ground speed and a look-up table for converting engine speed and fuel flow rates into engine load.

Figure 4:
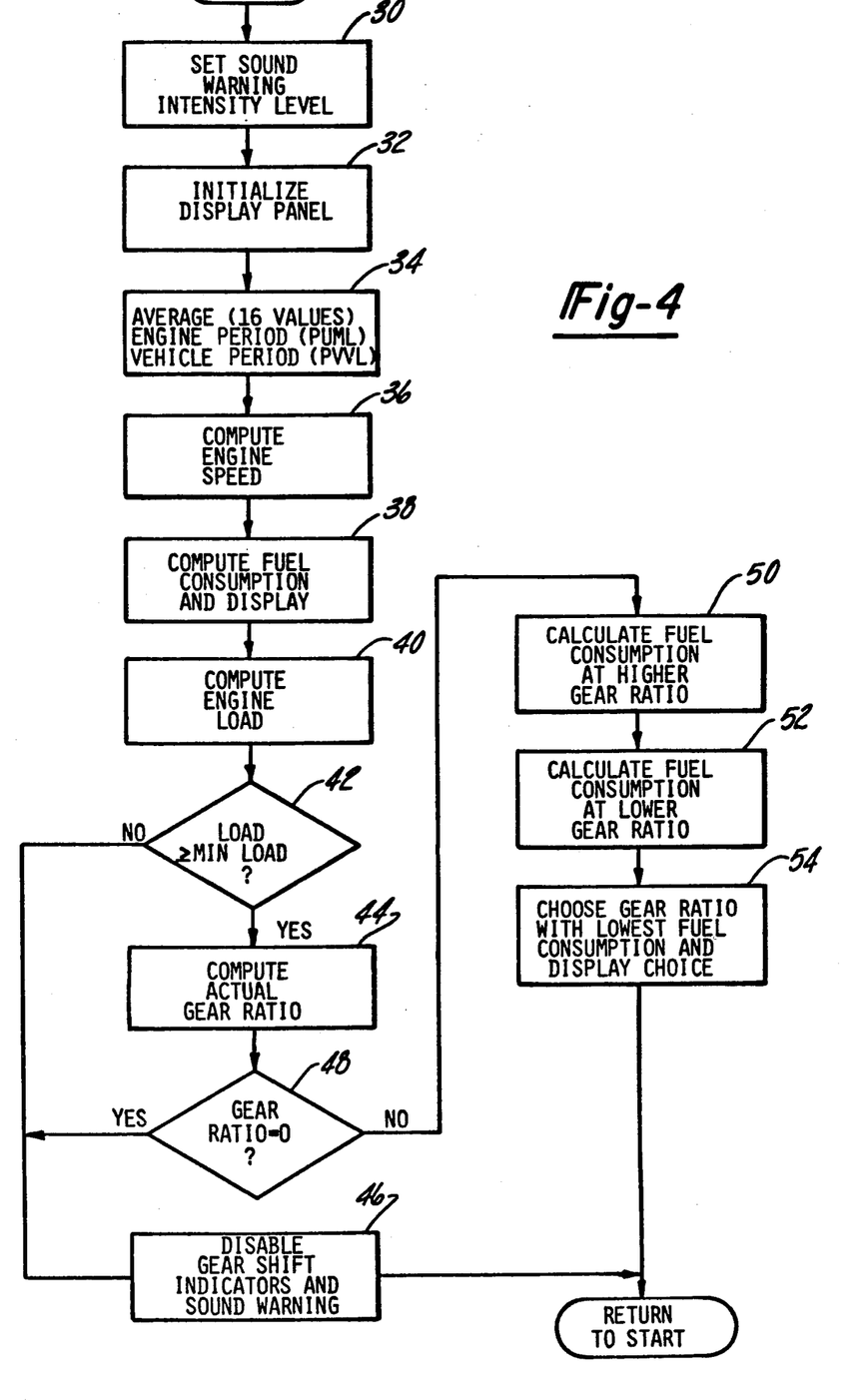
FIG. 4 is a flow diagram of the calculator's executive program.

The operation of the calculator 12 is illustrated in the flow diagrams of FIGS. 4 through 9. Referring first to FIG. 4, the Executive Program begins by setting the intensity level of the sound warning, indicated by block 30, then proceeds to initialize the display panel, indicated by block 32. The Executive Program then computes an average for 16 values of the engine speed and vehicle speed. In this particular embodiment, the signal indicative of the engine speed is the time (period) for the engine to make a complete revolution. In a like manner, the signal indicative of the vehicle speed is the revolution period of the transmission's output shaft. Knowing the gear ratio of the vehicle's rear axle and the circumference of the tires on the rear wheels, the ground speed of the vehicle can be calculated directly.

The Executive Program then calls for the calculation of the engine speed from the average engine period, block 36, and the rate of fuel consumption in liters per kilometer, block 38, in response to the ground speed of the vehicle and an input from a fuel flow rate sensor. The current rate of fuel consumption is displayed on digital display 20 of the display panel 16 as previously discussed.

The Executive Program next calls for the computation of the engine's instantaneous load from the engine speed and fuel flow rate, block 40. The subroutine for calculating engine load is given on the flow diagram of FIG. 5. The computed engine load is then compared, decision block 42, with a predetermined minimum engine load. If the computed engine load is greater than the minimum engine load, the Executive Program proceeds to calculate the transmission gear ratio, block 44. Otherwise, the Executive Program directs that the gear shift indicators 21 and 23 on the display panel 16 be disabled along with the sound alarm, block 46, and the Executive Program returns to the start of the program. After the gear ratio is calculated, the Executive Program inquires if the transmission is in the neutral position (gear ratio=0) decision block 48. If the computed gear ratio is not zero, the Executive Program calls for the computation of the fuel consumption at a higher gear ratio, block 50, and a lower gear ratio, block 52. The program then calls the subroutine which compares the fuel consumption computed at the higher and lower gear ratios with the fuel consumption at the current gear ratio and selects the gear ratio giving the lowest fuel consumption. Upon determination that a higher or lower gear ratio gives a lower fuel consumption, the corresponding gear shift indicator display 21 or 23, is activated along with the sound warning. If the current gear ratio is found to produce the lowest fuel consumption, display 22 is activated and the sound alarm disabled. One of the three gear shift displays 21, 22 or 23, is activated at all times. The Executive Program then returns back to "Start" and the program is repeated indefinitely. If the transmission is in the neutral position (gear ratio=0), decision block 48, the gear shift displays 21 and 23, along with the sound warning, are disabled and the Executive Program returns to "Start".

As is conventional with computer programs of this type, time based interrupts are provided for receiving inputs from the engine speed, vehicle speed, and fuel flow sensor, as well as time based interrupts controlling the display of the indicated data on the display panel, including the engine speed and ground speed displays 18 and 19 respectively, as well as the display of the current operational state of the engine on the load/speed diagram 17.

Figures 5, 6:
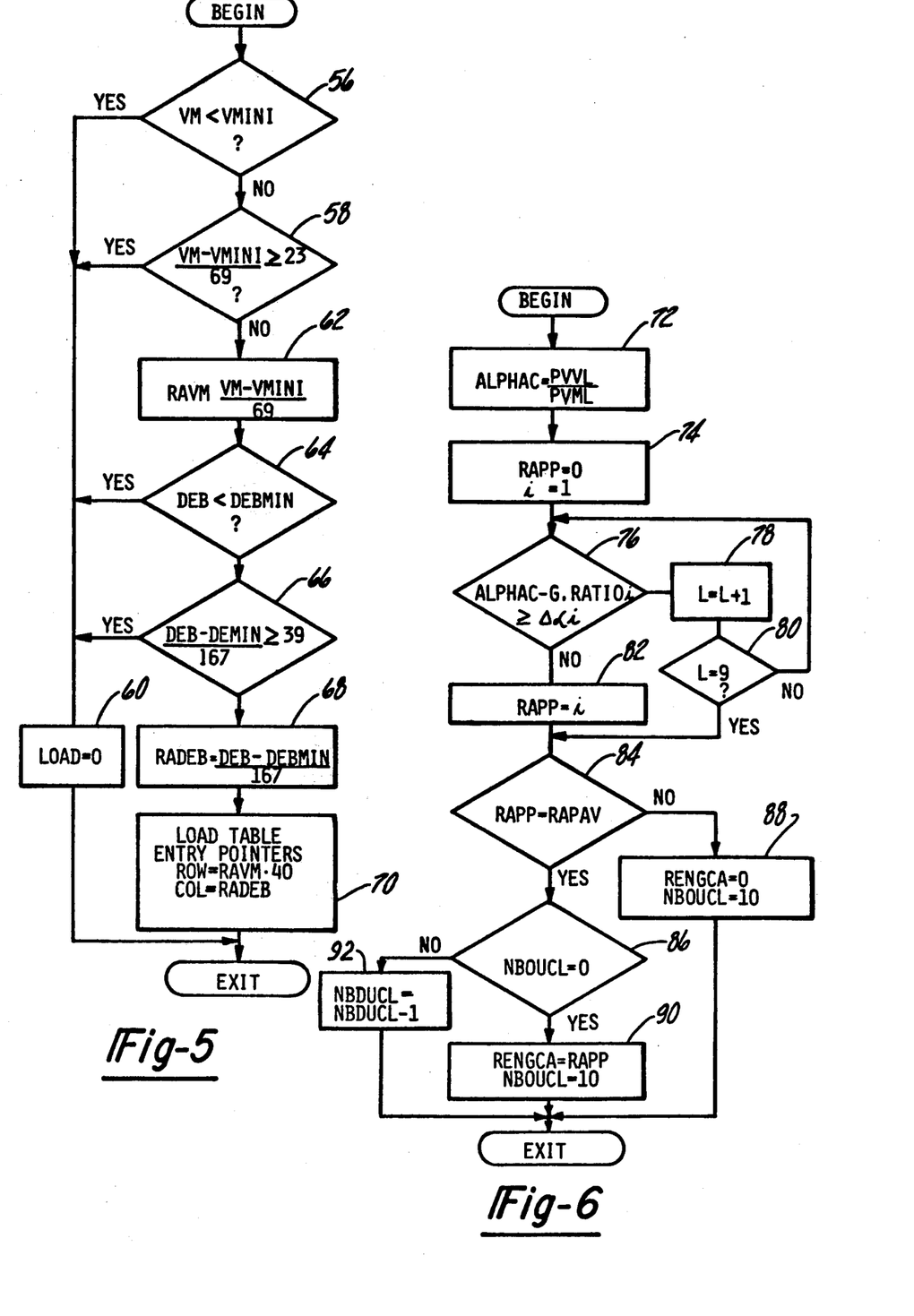
FIG. 5 is a subroutine flow diagram for the calculation of the engine load.
FIG. 6 is a subroutine flow diagram for calculating the gear ratio.

The flow diagram of the subroutine for computing engine load, block 40 of FIG. 4, is illustrated in FIG. 5. Referring to FIG. 5, the engine load is determined from a look-up table based on the engine speed (VM) and the fuel flow (DEB). The subroutine first compares the engine speed with a minimum engine speed (VMINI) then compares the value (VM-VMINI) divided by a predetermined constant (69) with a maximum value (23), decision blocks 56 and 58 respectively, to determine if the engine speed is within the limits of the load table. The constants and numerical values given on this and the following flow diagrams are for a particular engine and implementation and may be different for different sensors and other vehicles. They are presented here as representative values. If either comparison fails, the engine load is set at 0, block 60. If the engine speed is within the prescribed limits, the engine speed pointer (RAVM) is set to the value RAVM=(VM-VMINI)/69, block 62.

In a similar manner, the fuel flow rate (DEB) is compared with a minimum fuel flow rate (DEBMIN), then the value (DEB-DEMIN)/167 is compared with a predetermined constant (39), decision blocks 64 and 66 respectively. These comparisons determine if the fuel flow rate is within the limits of the load table. If the fuel flow rate (DEB) is not within the predetermined limits of the load table, the load is set at 0, block 60. Otherwise, the fuel flow rate pointer (RADEB) is set to (DEB-DEBMIN)/167, block 68. The engine load is then the value stored in the load table identified by the engine speed and fuel flow rate pointers RAVM (row) and RADEB (column) respectively, block 70, and the subroutine exits back to the Executive Program with the engine load being the value extracted from the load table or the fixed value set in block 60.

The subroutine for calculating the actual gear ratio (block 44 of FIG. 4) is illustrated in the flow diagram shown in FIG. 6. The computed gear ratio is basically the ratio between the periods of the transmission output shaft (PVVL) and period of the engine speed (PVML).

Referring to FIG. 6, the subroutine calculates the gear ratio ALPHAC by dividing the rotational period of the transmission's output shaft (PVVL) by the rotational period of the engine (PVML) block 72. The exact ratio is then found by setting the pointer RAPP to a gear ratio look-up table to the lowest gear ratio (RAPP=0), block 74. It then compares the difference between the calculated gear (ALPHAC) ratio with each gear ratio listed in the look-up table, decision block 76, and keeps incrementing the pointer (RAPP) until the absolute difference between ALPHAC and the gear ratio (i) extracted from the table is smaller than a predetermined value, blocks 78 and 80, or reaches the end of the table (i=9). Once this gear ratio is found in the look-up table, the pointer is set (RAPP=i) identifying the gear ratio in the table closest to the calculated value (ALPHAC). The pointer location is then compared with the previously found pointer location (RAPAV), decision block 84. If they are the same, the subroutine then checks to determine if this number has been repeated 10 times, block 86. If they are not the same, the found gear ratio (RENGCA) is set to zero and a counter (NBOUCL) is set equal to 10, block 88. When the number stored in the counter (NBOUCL) is equal 0, the found gear ratio (RENGCA) is set equal to pointer (RAPP) and the counter (NBOUCL) is set equal to 10, block 90, and the subroutine is exited. Otherwise, if the number stored in counter NBOUCL is not equal to 0, the number is decremented by 1, block 92, and the subroutine is exited. This procedure, which requires that the same gear ratio be found 10 times in a row, assures that the found gear ratio (RENGCA) is the actual gear ratio of the transmission.

Figure 7:
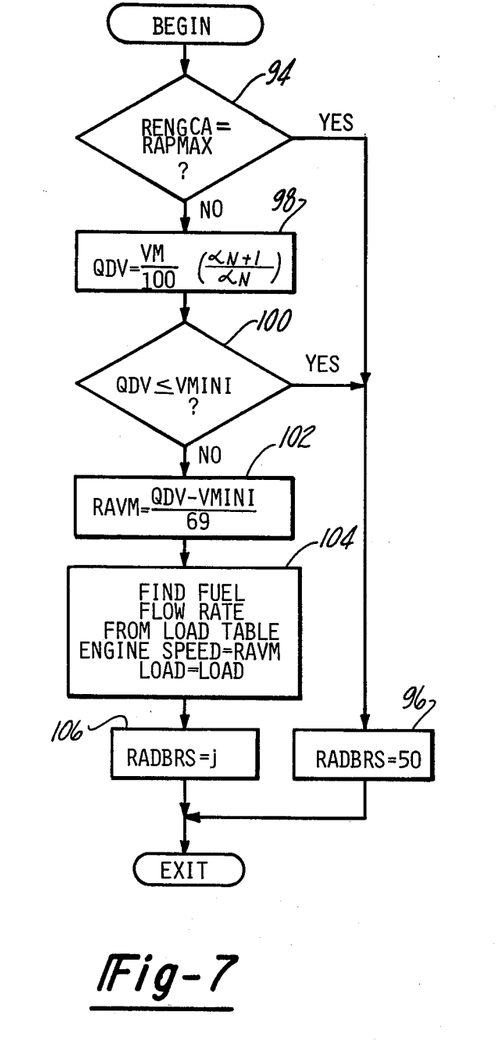
FIG. 7 is a subroutine flow diagram for calculating fuel consumption at a higher gear ratio.
Figure 8:
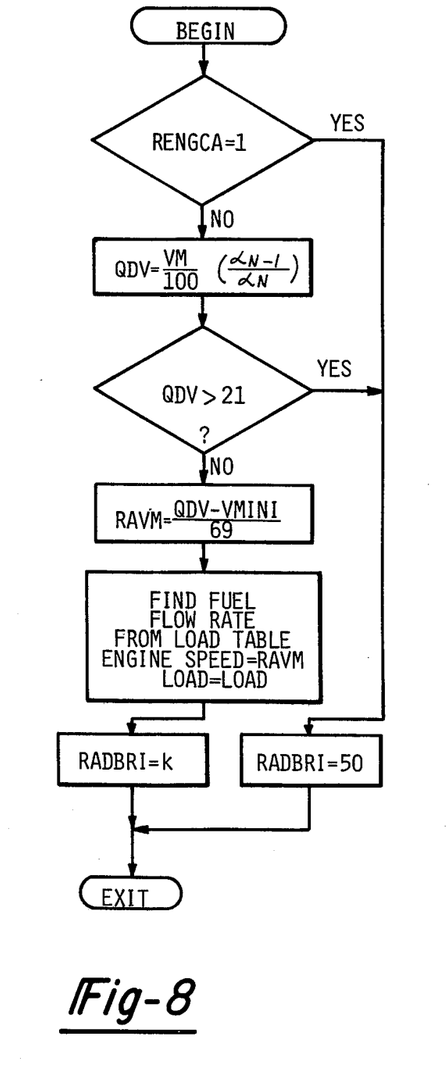
FIG. 8 is a subroutine flow diagram for calculating fuel consumption at a lower gear ratio.

The subroutines for computing the fuel flow rates with higher and lower gear ratios (blocks 50 and 52 of FIG. 4) are illustrated by the flow diagrams shown on FIGS. 7 and 8 respectively. Since the two procedures are complementary, only the flow diagram shown on FIG. 7 will be discussed in detail. Referring to FIG. 7, the found gear ratio (RENGCA) is compared with the maximum gear ratio RAPMAX (i=9), block 94. If RENGCA=RAPMAX, the calculated fuel flow (RADBRS) is set equal to a predetermined constant (50), block 96. Otherwise, the new engine speed QDV is calculated from the actual engine speed (VM) and the ratio between the next higher gear ratio $(a_{N+1})$ and the actual gear ratio $(a_N)$, block 98. The new engine speed (QDV) is then compared, block 100, with the minimum engine speed (VMINI). If new engine speed (QDV) is less than the minimum engine speed (VMINI), the new fuel flow rate RADBRS is set equal to the predetermined constant (50). Otherwise, the subroutine proceeds to calculate, block 102, the location for the engine speed pointer RAVM to the load table, where RAVM is equal to (QDV-VMINI)/69. This is the same procedure as previously described as with reference to block 62 of FIG. 5.

The subroutine then proceeds to interrogate the load table by incrementing the value of the fuel flow rate pointer (RADEB) until a load value is found which is the closest to the engine load computed in the subroutine described on FIG. 5. The routine to find the fuel flow rate corresponds to the procedure for finding the gear ratio previously described with reference to blocks 76, 78 and 80 of FIG. 6 and need not be repeated for an understanding of the invention. The value of the fuel flow rate at the higher gear ratio (RADBRS) is set equal to the location "j" of the fuel flow rate pointer which stores the load value most equal to the actual load value.

In the computation of the fuel flow rate at a lower gear ratio (RADBRI), FIG. 8, the fuel flow rate is set at the predetermined constant (50) when pointer of the found gear ratio (RENGCA) is equal to 1 or when QDV is greater than a predetermined constant (21). Otherwise, the fuel flow rate (RADBRI) is set to "k"

where "k" is the location in the load table where the stored load value is most equal to the computed load value. The subroutine then exits to the Executive Program.

Figure 9:
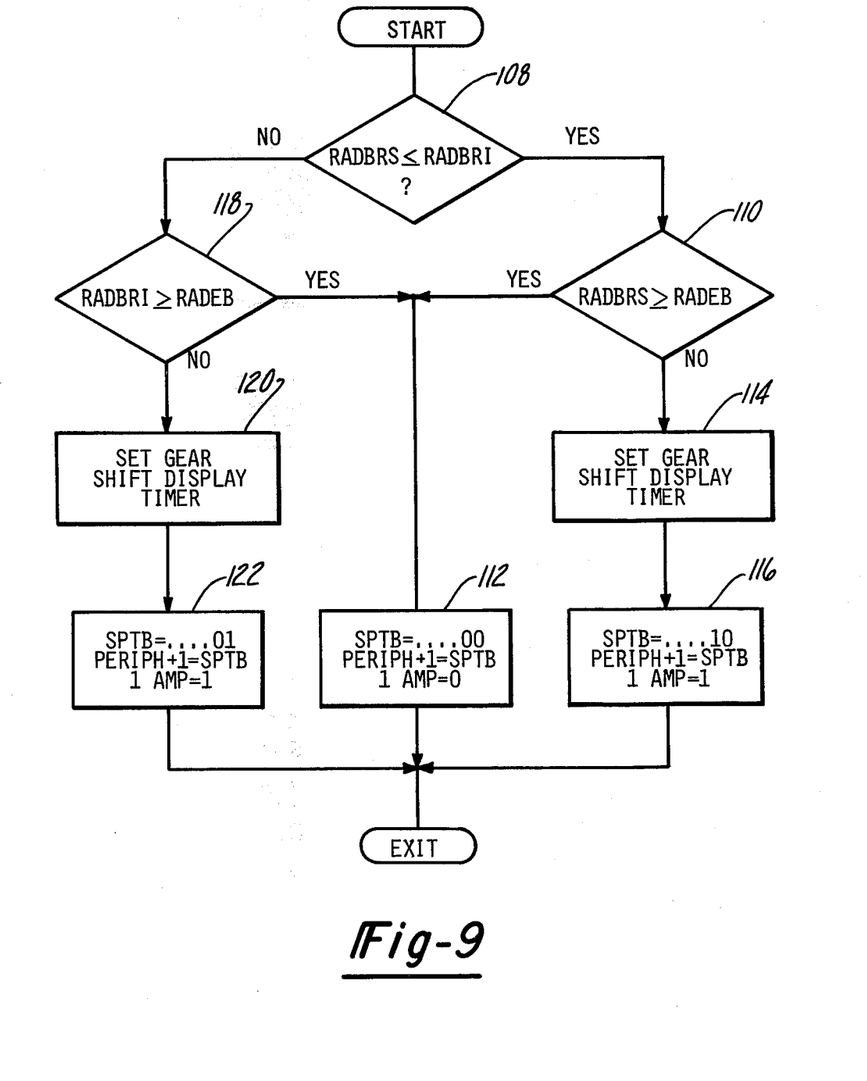
FIG. 9 is a subroutine flow diagram for choosing the gear ratio giving the lowest fuel consumption.

The subroutine for choosing the gear ratio with the lowest fuel consumption (block 54 of FIG. 4) is illustrated in the flow diagram of FIG. 9. Referring to FIG. 9, the subroutine first compares the values of the fuel flow rate stack pointers determined for the higher and lower gear ratios (RADBRS and RADBRI) respectiveley, decision block 108. If (RADBRI) is greater than (RADBRS), RADBRS is then compared, block 110, with the value of the stack pointer (RADEB) used to determine the actual load value from the load look-up table. If RADBRS is greater than RADEB then subroutine activates gear shift display 22 (PERIPH 1 = SPTB and SPTB= - - - 0.00) and the sound alarm is deactivated (1 AMP=0). The last two digits 00 of the word SPTB identifies gear shift display 22. Otherwise, the subroutine sets the display timer block 114 and activates gear shift display 21 (PERIPH+1=SPTB, SPTB= - - - 10) and activates the sound alarm (1 AMP=1), block 116.

If RADBRS is greater than RADBRI, block 108, then RADBRI is compared with RADEB, decision block 118. If RADBRI is greater than RADEB, the subroutine activates gear shift display 22 of the display panel, block 112, as previously discussed. Otherwise, the Gear Shift Display Timer is set, block 120, and gear shift display 23 is activated (PERIPH+1=SPTB and SPTB= - - - 01) along with the sound alarm (1 AMP=1), block 122. The Gear Shift Display Timer controls the duration of the display to produce a flashing indication of the desirability of shifting gears as well as pulsing the sound alarm to make it easier to hear over the ever present road and vehicle noises. As previously discussed, activation of gear shift indicator 21 indicates the desirability of shifting to a higher gear and gear shift indicator 23 indicates the desirability of shifting to a lower gear. This ends with the activation of one of the three gear shift indicators. The subroutine then exits back to the Executive Program where the cycle is repeated.

In response to time based interrupts, the values of the engine speed and vehicle speed are extracted from the calculator and displayed on the digital displays 18 and 19 of the display panel 16 and the calculated load and engine speed values are extracted to activate the appropriate light on the load/speed diagram display 17.

This driver assist apparatus can find its best application in the vehicles driven by the instructors responsible for the training of heavy truck drivers.

The same apparatus can also be used in the more common commercial vehicles in which case the display panel 16 could be simplified by deleting the panel 17.

The signals indicative of the desirability to shift gears can also directly control an automatic transmission system.

What is claimed is:

1. A method for assisting the operator of a motor vehicle to minimize the vehicle's fuel consumption wherein said vehicle includes an engine connected to a multiple gear ratio transmission, a first sensor generating a current engine speed signal having a value indicative of said engine's current speed, a second sensor generating a current ground speed signal having a value indicative of the vehicle's current ground speed, a third sensor generating a current fuel flow rate signal having a value indicative of the current fuel flow rate to said engine and a programmed computer having adequate storage and computational means, the method comprising the steps of:

dividing said current ground speed signal by said current engine speed signal to determine the current gear ratio of said transmission;
   storing in a load look-up table a plurality of load values, each load value associated with a particular engine speed and fuel flow rate;
   addressing said load look-up table with said current engine speed and current fuel flow rate signals to identify a current load value corresponding to the current engine load;
   multiplying said current engine speed signal by the ratio between said current gear ratio and the next highest gear ratio of said multiple gear ratio transmission to generate a higher gear ratio engine speed signal corresponding to the engine speed at said next highest gear ratio;
   addressing said load look-up table with said higher gear ratio engine speed signal to identify a first set of load values stored with respect to said higher gear ratio engine speed signal;
   sequentially addressing said load look-up table with increasing values of fuel flow rate signals to find a first fuel flow rate signal whose value addresses the load value in said first set of load values closest to said current load value;
   multiplying said current engine speed signal by the ratio between said current gear ratio and the next lowest gear ratio of said multiple gear ratio transmission to generate a lower gear ratio engine speed signal corresponding to the engine speed at the next lowest gear ratio;
   addressing said load look-up table with said lower gear ratio engine speed signal to identify a second set of load values corresponding to said lower gear ratio engine speed;
   sequentially addressing said load look-up table with increasing values of fuel flow rate signals to find a second fuel flow rate signal whose value addresses the load value stored in said second set of load values closest to said current load value;
   comparing said first and second fuel flow rate signals with said current fuel flow rate signal to generate at least a first change gear signal when said first fuel flow signal is less than said second and current fuel flow rate signals and a second change gear signal when said second fuel flow rate signal is less than said first and current fuel flow rate signals; and
   transmitting said first or second change gear signals to an operator perceptible device to generate an operator perceptible signal indicative of the desirability to shift said multiple gear ratio transmission to a gear ratio different from said current gear ratio to minimize the vehicle's fuel consumption.

2. The method of claim 1 wherein said operator perceptible device is a visual display, said step of transmitting transmits said first or second change gear signals to said visual display.

3. The method of claim 1 wherein said operator perceptible device is an audio alarm, said step of transmitting transmits said first or second change gear signals to said audio alarm.

4. The method of claim 1 wherein said operator perceptible device comprises a visual display and an audio alarm, said step of transmitting transmits said first or second change gear signals to said visual display and audio alarm.

5. The method of claim 2 wherein said visual display comprises:
   at least a first gear shift display indicating the desirability to shift said multiple gear ratio transmission to the next higher gear in response to said first gear change signal; and
   at least a second gear shift display indicating the desirability of shifting to the next lower gear ratio in response to said second change gear signal.

6. The method of claim 5 wherein said visual display further comprises an engine speed digital display, a ground speed digital display and a fuel consumption digital display, said method further comprises the steps of:
   dividing said current fuel flow rate signal by said current ground speed signal to generate a current fuel consumption signal;
   activating said engine speed digital display with said current engine speed signal to display a digital member corresponding to said current engine speed;
   activating said ground speed digital display with said current ground speed signal to display a number corresponding to said current ground speed; and
   activating said fuel consumption digital display with said current fuel consumption signal to display a number corresponding to the current fuel consumption of the vehicle.

7. The method of claim 6 wherein said visual display further comprises a load/speed diagram display and wherein said load/speed diagram display includes a load/speed diagram having a maximum load curve and a plurality of isometric curves defining areas of equal fuel consumption, and wherein said load/speed diagram display further comprises a matrix of orthogonally disposed light indicators defining a plurality of discrete locations on said load/speed diagram, and wherein one of said plurality of light indicators corresponds to a predetermined engine speed and engine load, said method further comprising activating said one of said plurality of light indicators corresponding to the current engine speed and current engine load in response to said current engine speed signal and said current load signal.

8. The method of claim 6 wherein said first sensor senses a parameter indicative of the rotational period of said engine, said second sensor senses the rotational period of said multiple gear ratio transmission's output shaft, and said third sensor senses the fuel flow rate of said engine.

9. The method of claim 8 wherein said step of dividing to determine said current gear ratio further comprises the steps of:
   dividing said current ground speed signal by said current engine speed to generate a calculated gear ratio;
   comparing said calculated gear ratio to the actual transmission gear ratios stored in an actual gear ratio look-up table to find the actual transmission gear ratio closest to said calculated gear ratio; and
   setting said current gear ratio equal to the closest actual transmission gear ratio.

10. The method of claim 9 wherein said visual display further comprises an engine speed digital display, a ground speed digital display, and a fuel consumption digital display, said method further comprising the steps of:
    dividing said current fuel flow rate signal by said current ground speed signal to generate a current fuel consumption signal;
    activating said engine speed digital display to display the current engine speed in response to said current engine speed signal;
    activating said ground speed digital display to display the current ground speed in response to said current ground speed signal; and
    activating said fuel consumption digital display to display the current fuel consumption in response to said current fuel consumption signal.

11. The method of claim 9 wherein said first step of addressing further comprises the steps of:
    dividing the difference between said current ground speed signal and a predetermined minimum ground speed with a first predetermined constant to generate a first position for a ground speed pointer to said load look-up table;
    dividing the difference between the current fuel flow rate signal and a predetermined minimum fuel flow rate by a second predetermined constant to generate a first position for a fuel flow rate pointer to said load look-up table; and
    setting said current engine load value equal to the load value stored in said load look-up table corresponding to the position of said ground speed pointer and said fuel flow rate pointer.

12. The method of claim 11 wherein said visual display further comprises an audio alarm, said first or second change gear signals further activates said audio alarm signaling the operator that the gear ratio having the lowest fuel consumption is different from said current gear ratio.

13. The method of claim 12 wherein said visual display further comprises an engine speed digital display, a ground speed digital display and a fuel consumption digital display, said method further comprising the steps of:
    dividing said current fuel flow rate signal by said current ground speed signal to generate a current fuel consumption signal;
    activating said engine speed digital display to display the current engine speed in response to said current engine speed signal;
    activating said ground speed digital display to display the current ground speed in response to said current ground speed signal; and
    activating said fuel consumption digital display to display the current fuel consumption in response to said current fuel consumption signal.

14. The method of claim 13 wherein said visual display further comprises a load/speed diagram display and wherein said load/speed diagram display includes a load/speed diagram having a maximum load curve and a plurality of isometric curves defining areas of equal fuel consumption, and wherein said load/speed diagram display further includes means for displaying the coordinate position of the current engine speed and current engine load on said load/speed diagram, said method further comprising the step of activating said means for displaying the coordinate position of the current engine speed and current engine load to display the coordinate position of the current engine speed and current engine load in response to said current engine speed signal and current load value.

15. The method of claim 14 wherein said means for displaying is a matrix of orthogonally disposed light indicators, each light indicator defining a discrete location on said load/speed diagram.

16. The method of claim 2 further comprising the steps of:
dividing said current fuel flow rate signal by said current ground speed signal to generate a current fuel consumption signal; and
transmitting said current fuel consumption signal to said visual display to generate a numerical indication indicative of the vehicle's current fuel consumption rate.

17. The method of claim 1 wherein said first sensor senses a parameter indicative of a rotational period of said engine, said second sensor senses the rotational period of said multiple gear ratio transmission's output shaft, and said third sensor senses the fuel flow to said engine.

18. The method of claim 17 wherein said step of dividing to determine the current gear ratio comprises the steps of:
dividing said current ground speed signal by said current engine speed signal to generate a calculated gear ratio;
comparing said calculated gear ratio to the actual transmission gear ratios stored in an actual gear ratio look-up table to find the actual transmission gear ratio closest to said calculated gear ratio; and
setting said current gear ratio equal to the closest actual transmission gear ratio.

19. The method of claim 18 wherein said first step of addressing comprises the steps of:
subtracting from the current ground speed signal a predetermined ground speed signal to generate a difference ground speed signal;
dividing said difference ground speed signal by a first predetermined constant to generate a first position of a first pointer pointing to a first coordinate position in said load look-up table;
subtracting from said current fuel flow rate signal a predetermined minimum fuel flow rate signal to generate a difference fuel flow rate signal; and
dividing said difference fuel flow rate signal by a second predetermined constant to generate a first position of a second pointer pointing to a second coordinate position in said load look-up table, the coordinate positions of said first and second pointers identifying a storage location storing a load value corresponding to said current load value.

20. The method of claim 5 wherein said visual display further comprises a third gear shift display indicating said current gear ratio gives the lowest fuel consumption, said step of comparing further comprising the step of generating a no gear change signal indicative of the current gear ratio giving the lowest fuel consumption and said step of transmitting transmits said no gear change signal to said visual display activating said third gear shift display.

21. An apparatus for assisting the operator of a motor vehicle to minimize the vehicle's fuel consumption wherein said vehicle includes an engine connected to a multiple gear ratio transmission comprising:
a first sensor responsive to the rotational speed of the engine to generate a current engine speed signal;
a second sensor responsive to the rotational speed of the transmission's output shaft for generating a ground speed signal indicative of the vehicle's ground speed;
a third sensor responsive to the rate of fuel flow to the engine for generating a current fuel flow rate signal;
means for generating a current gear ratio signal in response to said current engine speed and current ground speed signals;
an engine load look-up table storing a plurality of load values, each load value associated with a particular engine speed and a particular fuel flow rate;
means for addressing said engine load look-up table with said current engine speed and said current fuel flow rate signals to identify a current load value corresponding to the current engine load;
means for multiplying said current engine speed by the ratio between said current gear ratio and the next highest gear ratio of said transmission to generate a higher gear ratio engine speed signal and for multiplying said current engine speed by the ratio between said current gear ratio and the next lower gear ratio of said transmission to generate a lower gear ratio engine speed signal;
means for addressing said load look-up table with said higher gear ratio speed signal and said lower gear ratio signal to identify a first set of load values stored with respect to said higher gear ratio speed signal and a second set of load values stored with respect to said lower gear ratio speed signal respectively;
means for sequentially addressing said load look-up table with increasing values of fuel flow rate signals to find a first fuel flow rate signal whose value addresses the load value in said first set of load values closest to said current load value and find a second fuel flow rate signal whose value addresses the load value in said second set of load values closest to said current load value;
means for comparing said first and second fuel flow rate signals with said current fuel flow rate signal to generate at least a first change gear signal when said first fuel flow rate signal is less than said current and second fuel flow rate signals and a second change gear signal when said second fuel flow rate signal is less than said current and first fuel flow rate signal; and
an operator perceptible device responsive to said first and second change gear signals for generating an operator perceptible signal indicative of the desirability to shift said multiple gear ratio transmission to a gear ratio different from said current gear ratio to minimize the vehicle's fuel consumption.

22. The apparatus of claim 21 wherein said operator perceptible device further comprises:
a first visual gear shift display activated by said first change gear signal to indicate the desirability to shift said multiple gear ratio transmission to the next highest gear ratio; and
at least a second visual gear shift display activated by said second change gear signal to indicate the desirability to shift said multiple gear ratio transmission to the next lower gear ratio.

23. The apparatus of claim 22 wherein said operator perceptible device further comprises an audio alarm activated by either of said first or second change gear signals to generate an audible signal alerting the operator of the desirability to shift said multiple gear ratio transmission to a gear ratio different from said current gear ratio.

24. The apparatus of claim 21 wherein said operator perceptible device is an audio alarm activated by either of said first or second change gear signals to generate an audible signal alerting the operator to the desirability to shift said multiple gear ratio transmission to a gear ratio different from said current gear ratio.

* * * * *

UNITED STATES PATENT AND TRADEMARK OFFICE
CERTIFICATE OF CORRECTION

PATENT NO. : 4,463,427
DATED : July 31, 1984
INVENTOR(S) : Yves Bonnetain et al.

It is certified that error appears in the above-identified patent and that said Letters Patent is hereby corrected as shown below:

Column 5, line 42, delete "(DEB-DEMIN)" and insert ---- (DEB-DEBMIN) ----.

Column 7, line 16, delete "PERIPH 1" and insert ---- PERIPH + 1 ----.

In the Claims

Column 11, line 34, before "ground" insert ---- minimum ----.

Signed and Sealed this

Twenty-third Day of April 1985

[SEAL]

Attest:

DONALD J. QUIGG

Attesting Officer

Acting Commissioner of Patents and Trademarks